Figure 1:
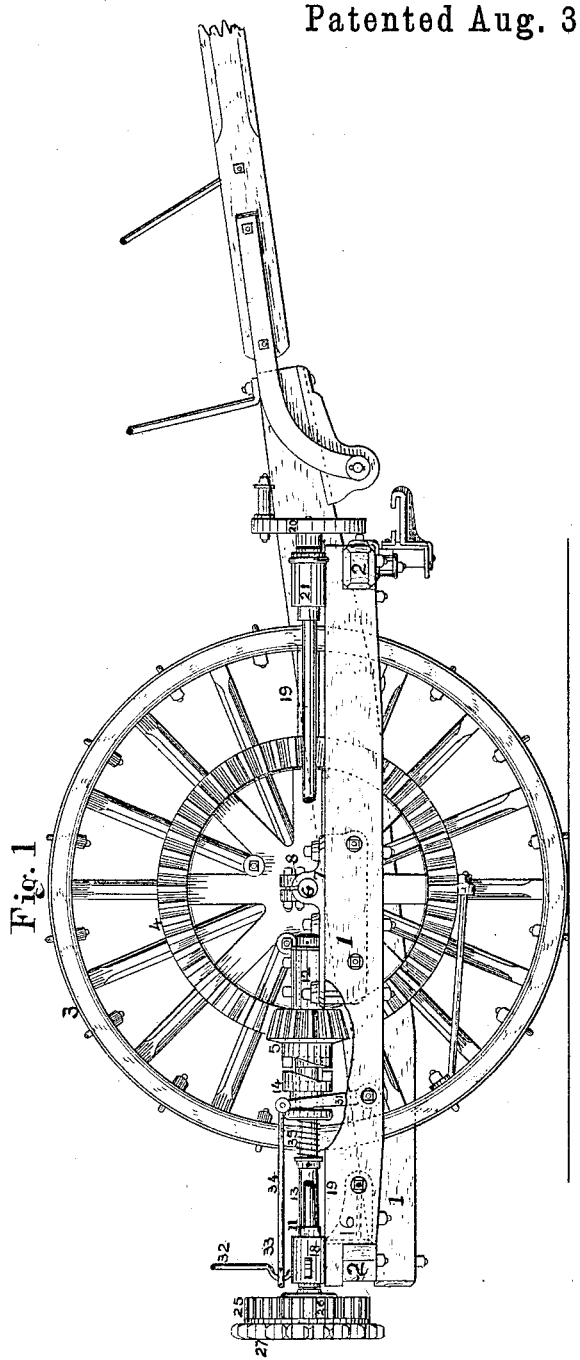

(Model.)

W. N. WHITELEY.
HARVESTER FRAME.

No. 348,304. Patented Aug. 31, 1886.

2 Sheets—Sheet 1.

Witnesses:
J. C. Turner
E. C. Ford

Inventor:
Wm. N. Whiteley
By his atty
R. D. Smith (Model.) 2 Sheets—Sheet 2.
W. N. WHITELEY.
HARVESTER FRAME.
No. 348,304. Patented Aug. 31, 1886.
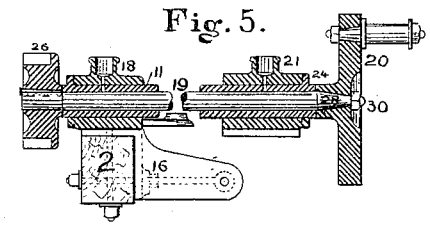
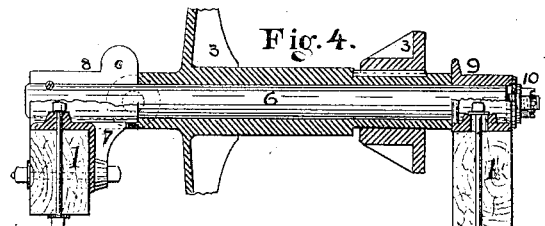
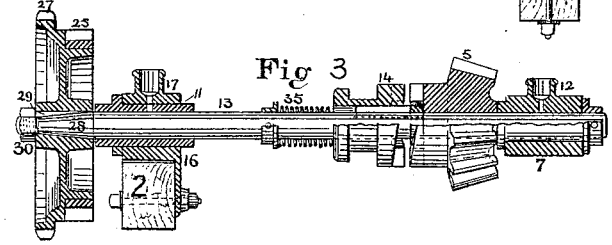
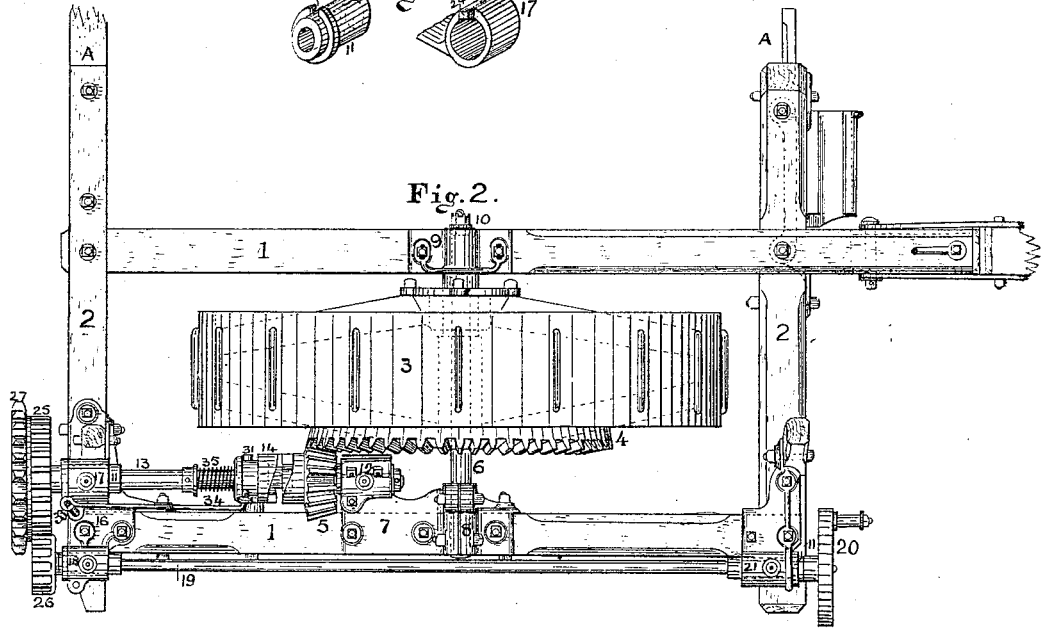
Witnesses:
J. C. Turner
E. C. Ford
Inventor:
W<sup>m</sup> N. Whiteley
By his att<sup>y</sup>
R. D. O. Smith

UNITED STATES PATENT OFFICE.

WILLIAM N. WHITELEY, OF SPRINGFIELD, OHIO.

HARVESTER-FRAME.

SPECIFICATION forming part of Letters Patent No. 348,304, dated August 31, 1886.

Application filed April 14, 1884. Serial No. 127,805. (Model.) Patented in Canada September 19, 1884, No. 20,282.

*To all whom it may concern:*

Be it known that I, WILLIAM N. WHITELEY, of Springfield, in the county of Clark and State of Ohio, have invented a new and useful Improvement in Harvester-Frames, &c.; and I do hereby declare that the following is a full and accurate description of the same.

The invention included in this specification is principally confined to that part of the harvester usually called the "main frame"—that is to say, the frame on which are the bearings for the main wheel and the principal shafts and gearing—whereby the motion of said wheel is transmitted to the operative machinery, and the principal subjects which I claim may be summarily pointed out as follows: First, the frame; second, the combination-box casting, whereby the frame is squared and strengthened; third, the main frame and stationary main axle rigidly secured to the side girts of said frame to strengthen and brace them; fourth, the axle-box casting; fifth, the stationary axle and mode of adjustment of the wheel thereon; sixth, the gearing whereby motion of the main wheel is transmitted to the operative machinery; seventh, the cutter-shaft whereby motion is transmitted to the knife.

Heretofore in building machines of this class the main or gear frame has been made one with the apron or platform frame, and it has therefore been necessary to ship the machines in a more dismembered condition than is desirable, because the intimate parts of a train of gearing which are required to work in connection and contact with each other can be assembled and adjusted in the machine-shop much more easily and accurately than anywhere else. I have therefore devised a way whereby the main or gear frame may be constructed independent of the platform or apron frame and all the principal gearing located thereon, so that the main wheel and said gearing may be all assembled and adjusted in the shop and sent out complete and in working order, and the parties who receive it are merely required to bolt together parts of the frame, and not mount any of the working members.

That others may fully understand my invention, I will particularly describe it, having reference to the accompanying drawings, wherein—

Figure 1 is a side elevation of my improvement. Fig. 2 is a plan of the same. Fig. 3 is a longitudinal section showing the pinion-shaft and contiguous parts. Fig. 4 is a section showing the attachments of the main-wheel axle. Fig. 5 is a section showing the counter-shaft and attachment. Fig. 6 is a detail of thimble-box.

To this end I construct a rectangular frame of parts 1 1 2 2, the former being the longitudinal side pieces and the latter being the transverse or end pieces extended beyond the side pieces, 1 1, on the side toward the grain, so as to present points of ready attachment for the girts A of the platform-frame.

The main wheel 3 may be constructed on any approved plan. It has a face-gear, 4, attached to its spokes, whereby motion is transmitted from said wheel to the pinion 5, and thereby to the operative machinery, as hereinafter described. The hub of the wheel 3 is bored true, and turns upon the stationary axle-rod 6, which is fixed at both ends to the side bars, 1, of the gear-frame. A cast angle-plate, 7, is provided, which embraces a part of the top and inner side of the side bar on the outer or stubble side of the machine, and is rigidly secured thereto by horizontal and vertical bolts, so that it cannot shift its position thereon. On the top of said plate there is a clamping-box, 8, to receive one end of the axle-rod 6, and firmly clamp it by clamp-screws. The axle-rod is thereby firmly held, and is strongly supported and kept truly in position. At its inner end toward the grain side of the machine said rod is held in a box, 9, which is bolted to the corresponding side bar, 1; but said box is provided with slotted bolt-holes, so that it may be shifted in position as required. The end of the axle has a screw-thread, and is fitted with a flanged nut, 10, which bears against the end of the box 9, and by means of this nut the box 9 may be moved up toward the wheel, to compensate for the wear at the end of the hub, consequent upon the pressure of the face-wheel 4 upon the teeth of the pinion 5, which tends to force the wheel against the opposite box.

The cast plate 7 is provided at its angle, and longitudinal therewith, with a seat or box, 11, and a clamping-box cover, 12, which is secured by bolts, and may be readily removed for the purpose of repair.

13 is the pinion-shaft, upon which the pinion 5 turns freely, except when engaged with the clutch 14, which is carried and movable upon said shaft, but turning with it.

At the rear end of the frame 1 2 there is a cast angle-plate, 16, which is bolted to the rear transverse beam of the frame, and also to the outer side beam, so as to stiffen the angle and materially strengthen said frame. Said plate also laps over the top of the frame-bars, and is provided with two hollow lugs or boxes, 17 and 18, the former whereof holds the thimble-bushing 11 for the rear end of the pinion-shaft 13, and the other holds the similar thimble-bushing for the rear bearing of the counter-shaft 19, whereby motion is communicated to the cutter-driving crank-wheel 20.

The thimble-bushings employed in all the bearings about the machine, being similar, will be understood from a description of one of them. The lug—say 17 or 21—is bored, and the thimble 11, having been previously bored to fit the shaft, is turned true on its outside to fit the bore in said lug. The thimble 11 is provided with a flange at one end, and in said flange is a notch, 23, into which enters a lug, 24, cast on the box. This prevents the thimble from turning in the box. The advantage of this way of making the bearings is in the facility with which the bearings may be restored when worn down by removing the thimble and replacing it with a new one. At the rear end of the shaft 13 there is a spur gear-wheel, 25, which meshes with and drives the pinion 26 on the shaft 19, and thereby motion is communicated from the main wheel to the crank-wheel 20, and to the cutters. Attached to the spur-wheel 25 there is a sprocket-wheel, 27, over which a chain belt passes, to communicate motion to the carrying and binding mechanism, which, not being included in this patent, does not require description herein. The wheels and pinions alluded to above are all put upon three shafts with taper seats, as shown at 28. A key, 29, is inserted in the usual way, and renders it impossible for the wheel to turn on the shaft; but the taper seat 28 renders the attachment tight and solid under all circumstances, because the holding-nut 30 will always force the wheel up to engagement with the shaft on the taper. This engagement is always solid, yet enables the wheel to be removed with the utmost ease, because when the nut 30 has been removed a slight motion of the wheel on its seat will loosen and liberate it immediately. An equally-solid engagement could not be secured upon a cylindrical seat without the nicest fitting, and then the wheel could only be removed with difficulty. The clutch-fork 31 is pivoted to the outer side bar, 1, and plays loosely in the groove of the clutch-collar. At the rear of the frame there is a crank-rod, 32, the lower end of which has a seat or socket on said frame, and the upper end is supported on the frame of the elevator in a position convenient to the hand of the attendant. The crank 33 of said rod is connected to the clutch-fork 31 by a connecting-rod, 34. Therefore when said rod is in one position said crank is turned toward the clutch, and the pinion is therefore in engagement, being pressed up by the spring 35 behind it, and the fork is then loose in the collar, and not subject to much, if any, friction therein; but when said rod 32 is rotated the connecting-rod 34 and clutch 14 are drawn back out of engagement, and both clutch and shaft come to rest. The play of the parts is such that the crank 33 is permitted to pass over rather more than half of one revolution, and therefore will hold the clutch in the disengaged position.

Having described my invention, I claim—

1. A main or gear frame adapted to surround the main wheel, separate from and independent of the frame, by which the cutting apparatus and binder are supported, combined with said main wheel, counter-shaft, and the operative gearing of the machine driven by said wheel, and bearing-boxes for the same attached to said frame, whereby all the primary operative gearing may be set up and adjusted on said frame at the factory and shipped entire, as and for the purpose set forth.

2. In combination, the main or gear frame, the main driving and supporting wheels mounted upon a stationary axle rigidly connected at its ends to the opposite sides of the gear-frame, and the angle-plate 7, which comprises a bearing-box for the main-wheel pinion-shaft, and a clamp, 8, whereby the driving-wheel axle is rigidly clamped and held, for the purpose of holding the master-wheel and its pinion firmly in gear.

3. The main frame provided with the clamping-boxes 8 9, combined with the stationary axle 6, for the main driving-wheel, rigidly clamped at each of its ends in said boxes, and thereby rigidly connected with the main frame on each side of the main driving-wheel, whereby rigidity is given to the main frame, as well as a support to the main wheel.

4. The combination, with the main-frame side bars, 1 1, and end bars, 2, of the angle-plate 7, lapping and bolted to two sides of the outer one of side bars, 1, provided with the clamp-box 8, and the pinion-shaft box having the removable cap 12, whereby the main axle 6 of the main wheel 3 is firmly clamped to strengthen the frame and the counter-shaft 13 supported in permanent position as to the axle.

5. The stationary axle 6 of the main driving-wheel, provided with a screw-nut at its extremity, the face-gear 4 upon the main wheel, and the adjustable box 9 upon the opposite end of the axle 6, for the purpose of setting the face-gear and keeping the same in proper adjustment against the pinion.

6. The combination, with the main-wheel frame, of the angle-box plate 16, fitted to the angle of the frame, lapping over the top of the frame, and provided with boxes 17 and 18, for retaining said boxes in place relatively, and to hold the main frame square and to stiffen the same.

WILLIAM N. WHITELEY.

Witnesses:
F. B. FURNISS,
L. PHILLIPS.